Figure 5:
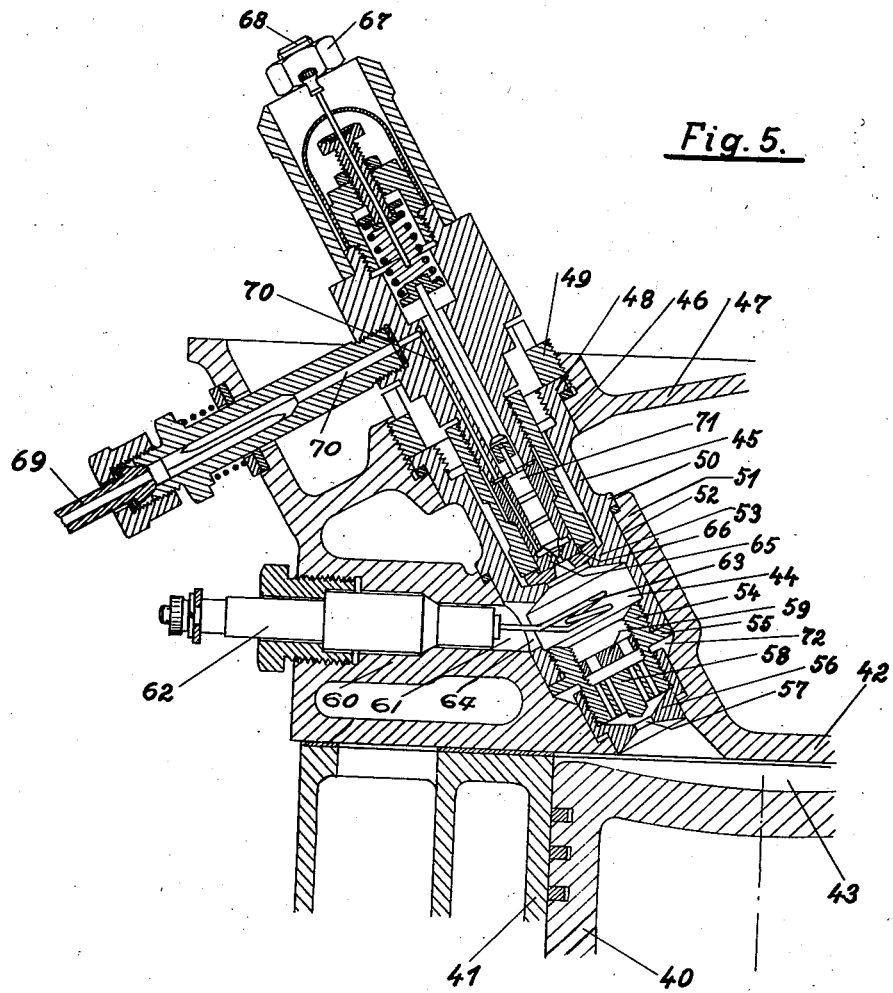

May 2, 1939.   K. ZINNER   2,156,327
INTERNAL COMBUSTION ENGINE
Filed March 27, 1936   2 Sheets-Sheet 1
Fig. 1.
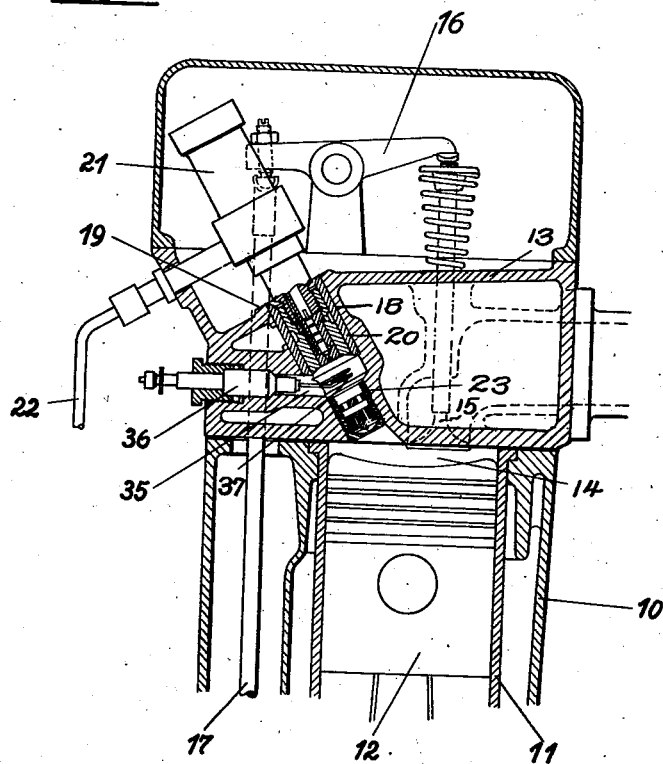
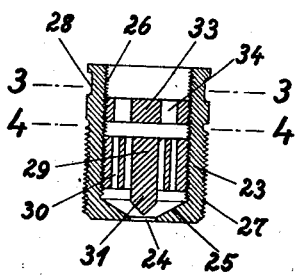
Fig. 2.
Fig. 3.
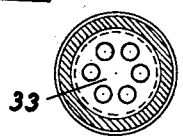
Fig. 4.
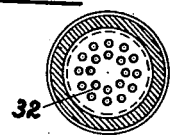
Inventor
Karl Zinner
A. A. Alick
Attorney May 2, 1939. K. ZINNER 2,156,327
INTERNAL COMBUSTION ENGINE
Filed March 27, 1936 2 Sheets-Sheet 2

Inventor
Attorney

Patented May 2, 1939

2,156,327

UNITED STATES PATENT OFFICE 2,156,327

INTERNAL COMBUSTION ENGINE

Karl Zinner, Dresden, Germany, assignor to Daimler-Benz Aktiengesellschaft, Stuttgart-Unterturkheim, Germany Application March 27, 1936, Serial No. 71,159
In Germany April 1, 1935

7 Claims. (Cl. 123—33)

My invention relates to internal combustion engines and, more particularly, to engines of the type in which a jet of fuel free from atomizing air is injected into a pre-combustion chamber communicating with the compression space of the cylinder.

The object of my invention is to provide a machine of this type capable of being operated with a liquid fuel of a comparatively high ignition temperature, such as tar oil. Previous experience has shown that it is extremely difficult to obtain a reliable operation and a complete and efficient combustion of such fuel. The oxygen and the temperature of the combustion air are of dominating importance for the prompt ignition of the fuel injected into the pre-combustion chamber. As the oxygen content can be varied within but small limits, a substantial improvement of the ignition and combustion may be attained by a raise of temperature only. It has been attempted prior to my invention to secure proper ignition and combustion of fuels having a high ignition temperature by the insertion in the pre-combustion chamber of heat accumulators which are not cooled and, therefore, become incandescent. These prior constructions, however, have not proved satisfactory. It was found that the heat accumulator had to be kept at a very high temperature to secure proper ignition when the engine was running under small load and, as a result, the injected fuel impinging upon the highly heated surface of the heat accumulator was cracked owing to the incomplete combustion, particularly occurring under full load conditions, whereby carbon was formed in the pre-combustion chamber.

More particularly, it is an object of my invention to provide heat accumulating means in the pre-combustion chamber which may be kept at a very high temperature without being liable to crack the fuel and to form carbon, thereby securing a complete and very efficient combustion.

According to one feature of my invention, the heat accumulator interposed between the pre-combustion chamber proper and the nozzle establishing communication between the pre-combustion chamber and the compression space of the cylinder is shielded from direct impingement by the injected jet of fuel. The gases flowing past and through the heat accumulator enter into intimate heat exchange relation therewith, whereby the combustion air compressed into the pre-combustion chamber will be heated to a very high temperature thus securing prompt ignition of the injected fuel. As the heat accumulator is shielded from direct impingement by the fuel, it will not be cooled by the jet and will keep its high temperature. Preferably, the heat accumulator is formed by a partition provided in the pre-combustion chamber near the bottom thereof. This partition is formed with a compact central portion surrounded by a multiplicity of comparatively narrow passages. The air flowing through these passages into the pre-combustion chamber and the burning gases flowing through the passages in the opposite direction enter into an intimate heat exchange relation with the compact central portion of the partition which accumulates the heat taken up from the burning gases and then imparts it to the inflowing air. Thus, a larger amount of heat will be accumulated than it would be possible without such a partition and the temperature of the combustion air will be raised to a higher limit than it would be possible by the effect of the compression alone. A perforated disc serves to shield the compact central portion of the partition from the direct impingement by the jet of fuel. The spacing of the disc from the partition and the dimensions of the passages must be chosen in dependence of the conditions prevailing in any particular case.

Further objects of my invention will appear from the description of a preferred embodiment following hereinafter and the features of novelty will be pointed out in the claims.

In the drawings, Fig. 1 is a vertical section through the upper part of an engine to which my invention is applied; Fig. 2 is an axial section through a bushing forming the nozzle-communication between the pre-combustion chamber and the cylinder and provided with the heat accumulator and the shielding disc; Fig. 3 is the section taken along line 3—3 of Fig. 2 showing a plan view of the shielding disc; Fig. 4 is the section taken along line 4—4 of Fig. 3 illustrating the plan view of the heat accumulator, and Fig. 5 is a section similar to that of Fig. 1 of a slightly modified embodiment in which the bushing forming the nozzle-communication and provided with the heat accumulator and the shielding disc is of a composite structure.

With reference to Fig. 1, 10 is a cylinder block of the engine. The cylinder proper is formed by a liner 11 inserted in the cylinder block and forming a cooling jacket therewith. The piston 12, the cylinder liner 11 and the cylinder head 13 mounted upon the cylinder block confine a compression space 14.

Suitable valves 15 are provided for the admission of air to and for the discharge of the burnt gases from the cylinder. The valves one of which only is visible in Fig. 1 are controlled in a well-known manner which need not be further described, the controlling means including a rocking lever 16 engaging the stem of the valve 15 and a reciprocatory rod 17.

The cylinder head is formed by a casting providing for inlet and outlet conduits for the air and the exhaust controlled by the valves 15. These conduits are surrounded by hollow spaces through which a cooling medium is circulated. Moreover, the cylinder head 13 is provided with a boring 18 traversing the cylinder head from a slanting upper face 19 to its lower face forming the top of the compression space 14. The upper part of this boring is of a larger diameter than the lower part and accommodates a sleeve 20 which is tightly fitted into the boring and, in its turn, serves to accommodate the fuel-injecting nozzle which need not be described in detail, as a description thereof will be given later with reference to Fig 5. It is sufficient to state that the fuel is fed to the fuel-injecting valve generally designated by 21 through a pipe 22 under a high pressure sufficient to lift a spring-controlled valve needle, whereby the fuel will be injected into the central portion of the boring 18 and will be finely atomized without the use of any additional atomizing air.

The lower reduced portion of the boring 18 is threaded and a bushing 23 is inserted therein. This bushing which is shown in Fig. 2 on an enlarged scale has a conical bottom 25 provided with a central opening 24 which constitutes a nozzle establishing a permanent communication between the compression space 14 of the cylinder and the precombustion chamber formed by the central and lower portion of the boring 18. The bushing is provided with an inner thread 26 and with an outer thread 27. The upper end of the bushing is left free from the outer thread and is adapted to tightly engage a corresponding cylindrical wall of the reduced lower portion of the boring 18. A peripheral recess 28 is provided in the bushing near the top thereof. This recess and the wall just referred to define a sealed annular heat insulating space which is so dimensioned that the bushing 23 will be kept at a higher temperature than the walls of the cylinder head.

For the purposes of my invention, I have inserted a heat accumulator in the bushing 23, namely, between the pre-combustion chamber proper and the cylinder. This heat accumulator is formed by a cylindrical member provided with a compact central portion 29 surrounded by a multiplicity of comparatively narrow borings 30 which constitute passages or ducts for the combustion air entering and for the burning gases leaving the pre-combustion chamber. It will be noted from Fig. 4 that two concentric circular rows of borings 30 are provided. Owing to the large total surface of these borings, the air and the gases flowing therethrough will enter into an intimate heat exchange relation with the compact central portion 29. This portion is formed with a lower tapered projection 31 which projects towards the nozzle 24 and together with the conical bottom face 25 of the bushing defines a passage having a gradually decreasing cross-section towards the nozzle.

The periphery of the cylindrical heat-accumulating member generally designated by 32, Fig. 4, is threaded and screwed into the bushing 23 and properly adjusted therein.

In order to prevent the jet or spray of fuel issuing from the nozzle 21 from impinging directly upon the highly heated compact portion 29, I have interposed a suitable shield which, in the instant embodiment, is formed by a circular disc 33 provided with exterior threads and screwed into the bushing 23 so as to be slightly spaced from the heat accumulator 32. The disc 33 is provided with a circular row of passages or borings 34. It will be noted from Fig. 2 that the axial dimension of the heat accumulator 32 is a multiple of tha of the disc 33; that the diameter of the borings 34 is a multiple of that of the borings 30 and that the number of the borings 30 is a multiple of that of the borings 34.

The cylinder head is formed with a horizontal boring 35 which communicates with the boring 18 and serves to accommodate a starting plug 36. This starting plug 36 which may be of a well-known type and, therefore, need not be described in detail is provided with an incandescent wire 37 which projects into the pre-combustion chamber and is so wound as to surround the spray or jet of fuel without intersecting the same. For the purpose of starting the engine, current is supplied to the starting plug whereby the winding of wire 37 will be highly heated thus raising the temperature of the combustion air to a degree securing proper ignition of the injected fuel. It is important that the winding of wire 37 be made of so large a diameter as not to be impinged by the injected fuel. Otherwise, the wire would be quickly destroyed.

The operation of the machine is as follows: As soon as the engine has been started, the compact portion 29 of the heat accumulator will be heated to a high temperature. The air compressed by the piston 12 in the cylinder 11 passes through the nozzle 24 and the borings 30 and 34 into the pre-combustion chamber. In passing the borings 30 it is heated to a very high temperature higher than that caused by the compression alone. The spray of fuel injected by the nozzle 21 is immediately ignited and is partly burnt and partly vaporized in the precombustion chamber. As a result, the pressure in the pre-combustion chamber is raised, whereby the mixture formed therein is driven out of the chamber through the borings 34 and 30 and through the nozzle 24 into the compression space 14 where it is mixed with the compressed air, thereby securing complete combustion. The burning gases passing through the borings 30 heat the compact portion 31 to a very high temperature. The disc 33 prevents the fuel particles from hitting directly the incandescent portion 29 and from forming carbon thereon.

The embodiment illustrated in Fig. 5 differs but slightly from that afore-described. The piston 40, the cylinder 41 and the cylinder head 42 confine a compression space 43 which has a substantially larger volume than the pre-combustion chamber 44. The cylinder head 42 is formed by a hollow casting through which a cooling medium is circulated.

The pre-combustion chamber 44 is formed by a sleeve 45 which is in direct contact with the cooling medium and, for this purpose, is inserted through a shouldered boring 46 provided in a slanting upper wall 47 of the cylinder head. The shoulder of this boring is engaged by an upper flange 48 of the sleeve 45, a suitable gasket being interposed, and is held in position by an annular nut 49.

The lower end of the sleeve 45 projects into a boring 52 of a boss 51 formed integral with the cylinder head. A peripheral collar 50 of the sleeve 45 engages an inner shoulder of the boring 52, a suitable gasket being interposed.

The sleeve 45 is formed with an inner collar 53 which forms part of the top wall of the pre-combustion chamber. The lower end of the sleeve 45 is provided with an interior thread into which a bushing is screwed having a flange 55 engaging tightly the lower end face of the sleeve 45. This bushing is of a composite structure as it consists of the upper part 54 and the lower part 56 which are attached to each other by suitable screw threads. The part 56 has a conical bottom, similar to the bottom 25 provided with a central nozzle 57 which establishes permanent communication between the pre-combustion chamber and the compression space 43. The part 54, 55 of the bushing is provided with a thick bottom which constitutes the heat-accumulating member. This heat-accumulating member is of substantially the same structure as that described above, that is to say, it has a compact central portion 58 surrounded by two circular rows of narrow borings.

The portion 54 of the bushing is provided with an inner thread in which the shielding plate 59 is inserted. This shielding plate corresponds substantially to the shielding plate 33 and, therefore, need not be described in detail.

As in the above described embodiment, the boss 51 is formed integral with a boss 60 traversed by a horizontal boring 61 communicating with the boring 32 and accommodating a starting plug 62. The incandescent wire 63 of the starting plug projects through a lateral boring 64 of the sleeve 45 into the pre-combustion chamber 44. The wire is so wound as to surround the jet or spray of the fuel without intersecting the same for the reason above explained.

Owing to the high temperature imparted to the air entering the pre-combustion chamber, the walls of this chamber will reach a very high temperature. Therefore, special precautions must be taken to avoid an overheating of the lower end of the fuel-injecting nozzle. This lower end is designated by 65. I have found that its overheating may be successfully prevented by the interposition of an annular disc 66 of a material of high heat-conductivity, such as copper. Moreover, copper has the advantage of being comparatively pliant. Therefore, the annular disc 66 may serve the twofold purpose of serving as a gasket preventing the highly heated combustion gases from passing up along the injecting nozzle and heating the same and of dissipating the heat and conducting the same to the cooled sleeve 45.

The composite bushing 54, 56 is surrounded by an annular sealed insulating space 72.

The fuel-injecting nozzle which need not be described in detail is pressed against the disc 66 by nuts 67 screwed upon bolts 68 attached to the cylinder head. The fuel is fed from a pump under pressure through a pipe 69 and enters through suitable conduits 70 an annular space surrounding the lower end of a spring-pressed injection valve 71, which is lifted under the pressure of said fuel against the action of its spring and admits the fuel into the pre-combustion chamber 44 in a fine spray.

My invention is capable of numerous modifications and is not restricted to the details above described. While the heat accumulator has been shown in the above embodiments as being separate from the bottom wall of the pre-combustion chamber, such as wall 56, it will be readily understood that it may be made in one part therewith, if desired.

Other modifications and changes in my invention as defined in the claims which follow will be apparent to those skilled in the art.

What I claim is:

1. In an internal combustion engine, the combination comprising a cylinder space, a precombustion chamber in permanent communication with said cylinder space, a fuel injecting nozzle opening into said precombustion chamber, a partition in said precombustion chamber arranged adjacent to said cylinder space and provided with a center core portion which is of appreciable mass to accumulate heat and is surrounded by a multiplicity of narrow openings, and a perforated disc interposed between said fuel injecting nozzle and said partition, spaced from but close to the latter and having a solid central portion arranged in line with said center core portion and adapted to shield the latter from direct impingement by the jet of fuel, the perforations in said disc surrounding the solid central portion being arranged substantially in line with said narrow openings.

2. In an internal combustion engine, the combination comprising a cylinder, a precombustion chamber, a permanent communication between said cylinder and said precombustion chamber, a fuel injecting nozzle opening into said precombustion chamber, a partition in said precombustion chamber arranged adjacent to said communication, and provided with a multiplicity of bores and with a center core portion which is of appreciable mass to accumulate heat, and a perforated disc interposed between said fuel injecting nozzle and said partition, spaced from but close to the latter and adapted to shield said compact central portion from direct impingement from the jet of fuel, the number of said bores being a multiple of the number of the perforations of said disc and the diameter of said bores being smaller than the diameter of said perforations.

3. In an internal combustion engine, a cylinder, a precombustion chamber communicating therewith, said precombustion chamber consisting of relatively wide and narrow portions, said narrow portions being positioned between the wide portion of said precombustion chamber and the cylinder and thereby forming the connection between the precombustion chamber and the cylinder, a fuel injecting nozzle in the wide portion of the precombustion chamber, by means of which the fuel is injected without air into the narrow portion of the precombustion chamber, a solid core member surrounded by penetrating openings serving as heat accumulator and positioned in the narrow portion of the precombustion chamber nearest the cylinder, and a perforated shielding plate positioned at a distance from said core member and inside the narrow portion of the precombustion chamber between the injection nozzle and said core member, the perforations in said shielding plate being positioned substantially outside of the fuel stream injected in the direction of the solid core member, whereby the shielding plate protects the core member, which serves as a heat accumulator, from direct impingement of the fuel injected from said nozzle, the thickness of said shielding plate being less than that of the solid core member.

4. In an internal combustion engine, a main combustion space, a precombustion chamber, an injection nozzle through which the fuel is injected without air into said precombustion chamber, an intervening wall between the precombustion chamber and the main combustion space having a throttle opening therein, an intermediate partition in the precombustion chamber in front of said wall, said partition having a plurality of penetrating passages surrounding a core piece positioned before the throttle opening and serving as a heat accumulator, and a perforated shielding plate positioned at a distance from the intermediate partition between the injecting nozzle and said intermediate partition, the perforations of said shielding plate being positioned substantially outside of the fuel stream injected in the direction of the core piece, whereby said shielding plate protects said core piece against a direct impact of the fuel injected from said nozzle.

5. In an internal combustion engine, a cylinder, a precombustion chamber, a fuel injecting nozzle through which the fuel is injected into the precombustion chamber without air, a throttling connection between said precombustion chamber and said cylinder which is positioned at that end of the precombustion chamber opposite the fuel injecting nozzle, a solid core member serving as a heat accumulator in the precombustion chamber on the side of said throttle connection, said solid member including surrounding penetrating openings through which the collected air passing from the cylinder into the precombustion chamber must pass, and a perforated shielding plate spaced from but relatively near said solid member, between the injection nozzle and said solid member, the holes in said shielding plate being positioned substantially outside of the fuel stream injected in the direction of the fuel member, whereby the shielding plate protects the solid member serving as a heat accumulator against a direct impact of the fuel injected from the nozzle, the thickness of said shielding plate being less than that of said fuel member serving as a heat accumulator.

6. In an internal combustion engine, the combination comprising a cylinder space, a precombustion chamber in permanent communication with said cylinder space, a fuel injecting nozzle opening into said precombustion chamber, a partition in said precombustion chamber arranged adjacent to said cylinder space and provided with a center core portion which is of appreciable mass to accumulate heat and is surrounded by a multiplicity of narrow openings, and a perforated disc interposed between said fuel injecting nozzle and said partition, spaced from but close to the latter and having a solid central portion arranged in line with said center core portion and adapted to shield the latter from direct impingement by the jet of fuel.

7. In an internal combustion engine, the combination according to claim 6 wherein the said partition is of substantially greater thickness than the said perforated disc.

KARL ZINNER.